United States Patent
Gauvin et al.

(10) Patent No.: US 10,652,370 B2
(45) Date of Patent: May 12, 2020

(54) SYSTEM AND METHOD FOR TRANSFERRING IMAGE SYSTEMS OF DIFFERENT TYPES BETWEEN COMPUTERS IN A SINGLE DATA PACKET

(71) Applicant: Bank of America Corporation, Charlotte, NC (US)

(72) Inventors: Timmy Leo Gauvin, Peachtree City, GA (US); Kenneth R. Cox, Ooltewah, TN (US); Haywood P. Enloe, Houston, TX (US); Jasher David Fowles, Davidson, NC (US); Georgeann Paschal Gregory, Charlotte, NC (US); Christopher David Greth, Concord, NC (US); Shawn Cart Gunsolley, Charlotte, NC (US); Charles Christopher Harbinson, Charlotte, NC (US); Leslie Marie LaRock, Davidson, NC (US); Clarence E. Lee, II, Mansfield, TX (US); Timothy Alan Mincey, Belmont, NC (US); Jeanne Marie Moulton, Charlotte, NC (US); Raymond William Schall, Jr., St. Louis, MO (US); Tami Marie Shepard, Battle Ground, WA (US); Michael G. Smith, Brooks, KY (US); Shashi R. Warrier, Marvin, NC (US)

(73) Assignee: Bank of America Corporation, Charlotte, NC (US)

( * ) Notice: Subject to any disclaimer, the term of this patent is extended or adjusted under 35 U.S.C. 154(b) by 257 days.

(21) Appl. No.: 15/835,138

(22) Filed: Dec. 7, 2017

(65) Prior Publication Data
US 2019/0182369 A1 Jun. 13, 2019

(51) Int. Cl.
*G06Q 40/00* (2012.01)
*H04L 29/08* (2006.01)
(Continued)

(52) U.S. Cl.
CPC ............ *H04L 69/324* (2013.01); *G06F 16/58* (2019.01); *G06F 21/6227* (2013.01);
(Continued)

(58) Field of Classification Search
CPC ....... H04L 69/324; H04L 45/72; G06F 16/58; G06F 21/6227; G06Q 20/10; G06Q 20/381
(Continued)

(56) References Cited

U.S. PATENT DOCUMENTS 6,661,910 B2 * 12/2003 Jones ................. G06K 9/00979
235/379
7,006,664 B2 * 2/2006 Paraskevakos .......... G07D 7/12
382/100

(Continued)

OTHER PUBLICATIONS

Kirschenmann, J. (Oct. 29, 2004). Technology Curbs Check-Floating. Argus Leader Retrieved from http://dialog.proquest.com/professional/docview/282850055?accountid=131444 on Mar. 6, 2020 (Year: 2004).*

(Continued)

*Primary Examiner* — Kito R Robinson
(74) *Attorney, Agent, or Firm* — Michael A. Spring

(57) ABSTRACT

An image item processing engine for image item exchange may receive an image item data packet including two image items, each including a digital image documenting an action for a recipient institution and associated metadata. The metadata may identify the image item sender and a country associated with an image item, the packet originator, or the recipient institution, at least one country associated with the (Continued)

second image item being different than a country associated with the first image item. The engine may apply sorting rules to determine item types for the first and second image items based on their metadata, determine a recipient institution for the packet based on the item types, assemble a data transfer packet including the digital images and metadata included in the first and second image items, and provide the data transfer packet to a transfer packet routing service for routing to the selected recipient institution.

19 Claims, 5 Drawing Sheets

(51) Int. Cl.
- *H04L 12/721* (2013.01)
- *G06Q 20/38* (2012.01)
- *G06Q 20/10* (2012.01)
- *G06F 16/58* (2019.01)
- *G06F 21/62* (2013.01)

(52) U.S. Cl.
CPC ........... *G06Q 20/10* (2013.01); *G06Q 20/381* (2013.01); *H04L 45/72* (2013.01); *H04L 2209/38* (2013.01)

(58) Field of Classification Search
USPC ................................................. 705/35; 435/2
See application file for complete search history.

(56) References Cited

U.S. PATENT DOCUMENTS

| | | | | |
|---|---|---|---|---|
| 8,688,579 | B1* | 4/2014 | Ethington | G06Q 20/0425 705/42 |
| 9,779,392 | B1* | 10/2017 | Prasad | G06Q 20/0425 |
| 2005/0097046 | A1 | 5/2005 | Singfield | |
| 2005/0097050 | A1 | 5/2005 | Orcutt | |
| 2007/0226139 | A1* | 9/2007 | Crumbach | G06Q 20/102 705/40 |
| 2008/0086420 | A1* | 4/2008 | Gilder | G06Q 20/04 705/44 |
| 2010/0161466 | A1* | 6/2010 | Gilder | G06Q 20/04 705/34 |
| 2013/0201307 | A1* | 8/2013 | Schloter | H04N 5/23229 348/61 |
| 2015/0262136 | A1* | 9/2015 | Clementi | G06Q 20/042 705/45 |
| 2017/0024731 | A1* | 1/2017 | Gullett | G06Q 20/08 |
| 2017/0061397 | A1* | 3/2017 | Lee | G06Q 20/065 |

OTHER PUBLICATIONS

NCR corporation; NCR completes india's largest electronic cheque truncation project for NPCI. (Dec. 9, 2014). Journal of India Retrieved from http://dialog.proquest.com/professional/docview/1629670146?accountid=131444 on Mar. 6, 2020 (Year: 2014).*

McEachern, C. (2005). Wells fargo bets big on check imaging—furthers its commitment to check 21 act. VARbusiness, 21(4), 56. Retrieved from http://dialog.proquest.com/professional/docview/194169675?accountid=131444 on Mar. 6, 2020 (Year: 2005).*

* cited by examiner

SYSTEM AND METHOD FOR TRANSFERRING IMAGE SYSTEMS OF DIFFERENT TYPES BETWEEN COMPUTERS IN A SINGLE DATA PACKET

TECHNICAL FIELD

The present disclosure relates generally to computer architectures for exchanging image items, and more particularly to systems and methods for transferring multiple image items of different types between computers in a single data packet.

BACKGROUND

Digital image data exchanged between computers typically includes data representing a digital image and, in some cases, metadata associated with the digital image. In a conventional system for exchanging image data between multiple computers, the system is configured to transfer image data for each digital image individually in a respective data packet or, in some cases, to transfer image data for digital images of the same type, such as digital images in which the depicted images are usable for the same or a similar purpose and/or for which any associated metadata shares a common format and includes common characteristics, within a single transfer operation to a recipient computer system.

Digital image data that originates from particular individuals, institutions, or countries or that includes digital images in which the depicted images are intended for particular purposes can include metadata having a different formats and including different characteristics than digital image data that originates from other individuals, institutions, or countries or that includes digital images in which the depicted images are intended for different purposes, such as to initiate the performance of different types of actions on the part of recipient computer systems.

The technical challenges resulting from the conventional systems described above include the need to efficiently transfer large amounts of digital image data of different types between computers. This is especially challenging when one portion of the digital image data originates from, or is intended to be transferred to, one or more computers in a country other than the country from which another portion of the data originates or to which it is intended to be transferred. Conventional systems typically handle received digital image data that includes digital images of mixed types through exception processing, which may include manual sorting exercises or other interventions on the part of operators or administrators of the system.

Thus, it is desirable to provide a solution that allows multiple image items of different types to be transferred between computers operated by, or on behalf of, different institutions, some of which may operate in different countries, automatically and within a single data transfer packet.

SUMMARY

The technical challenges resulting from conventional systems for exchanging digital image data include the need to efficiently transfer large amounts of digital image data of different types between computers. This is especially challenging when one portion of the digital image data originates from, or is intended to be transferred to, one or more computers in a country other than the country from which another portion of the data originates or to which it is intended to be transferred. Conventional systems typically handle received digital image data that includes digital images of mixed types through exception processing, which may include manual sorting exercises or other interventions on the part of operators or administrators of the system.

The system described in the present application provides a technical solution that allows multiple image items of different types to be transferred between computers operated by, or on behalf of, different institutions, some of which may operate in different countries, automatically and within a single data transfer packet. For example, the system may be configured to receive an image item data packet that includes multiple image items including digital images of different types and associated metadata, and to apply sorting rules to determine a type for each image item and a type for the image item data packet based on the associated metadata. At least some of the sorting rules may be dependent on a country-specific metadata format, language, or currency. Based on the results of this typing, the system may be configured to determine a class of recipient institutions that is capable of, and is authorized to, process image item data packets having the particular type (or types) of image items included in the image item data packet and to assemble a single data transfer packet, including all of the image items and associated data, that meets the formatting and content requirements of institutions of the determined class for incoming data transfer packets. The system may then initiate the routing of the data transfer packet to a recipient institution of the determined type for processing.

In some embodiments, each digital image may depict a physical item documenting an action to be taken by a recipient institution. Determining the class of recipient institutions to which the image item data packet should be routed may be dependent on the capability, and authorization, of the recipient institutions in different classes to perform the types of actions depicted in the digital images. In one example, the system may allow digital images of checks or other negotiable instruments drawn on banks in different countries to be automatically transferred, in a single data packet, to a recipient institution of a class that is capable of, and authorized to, perform the actions depicted in the digital images (e.g., to make corresponding deposits and/or withdrawals).

By incorporating the system and methods of the image item processing engine described herein, including the use of an item type identification application and a transfer packet constructor, individuals, institutions or enterprises that exchange image items with the recipient institutions that perform actions documented in those image items may benefit from the ability to automatically route image items of different types between computing systems in a single data transfer packet.

In one embodiment, a disclosed image item processing engine for image item exchange may include a first interface operable to communicatively couple the image item processing engine to one or more image capture applications from which image item data packets are received. Each image item data packet may include multiple image items, and each image item may include a respective digital image of a physical item documenting an action to be taken by a recipient institution and metadata associated with the digital image. The metadata may include an identifier of the sender of the image item, and at least one of an identifier of a country associated with the physical item, an identifier of a country associated with the packet originator, or an identifier of a country associated with the recipient institution. The first interface may receive, from a first image capture application, a first image item data packet including a first image item and a second image item. In some embodiments, at least one country identified in the metadata included in the second image item may be different than a country identified in the metadata included in the first image item.

In some embodiments, the image item processing engine may include an item type identification application operable to apply predetermined sorting rules to determine an item type for the first image item based on the metadata included in the first image item, apply the predetermined sorting rules to determine an item type for the second image item based on the metadata included in the second image item, and determine, based on the item type for the first image item and the item type for the second image item, a selected one of multiple recipient institutions to which the first image item data packet is to be transferred for performance of the actions documented by the respective digital images included in the first image item and the second image item. The image item processing engine may include a transfer packet constructor operable to assemble a first data transfer packet including the digital image included in the first image item, the metadata associated with the first image item, the digital image included in the second image item, and the metadata associated with the second image item. The first data transfer packet may be a data transfer packet of a first one of multiple data transfer packet types selected based on the selected recipient institution. The image item processing engine may also include a second interface operable to communicatively couple the image item processing engine to a transfer packet routing service that routes data transfer packets to respective recipient institutions, and to provide the first data transfer packet to the transfer packet routing service for routing to the selected recipient institution.

In some embodiments, each of the recipient institutions may be a member of a respective class of recipient institutions authorized to receive data transfer packets of one or more specific data transfer packet types, and the selected recipient institution is a member of a first class of recipient institutions authorized to receive data transfer packets of the first data transfer packet type. In some embodiments, the image item processing engine may further include multiple ledger update applications, each of which is operable to receive and post data representing the actions documented by the respective digital images included in data transfer packets of one or more specific data transfer packet types, and a first ledger update application may be operable to receive and post data representing the actions documented by the digital images included in the first data transfer packet. In some embodiments, the image item processing engine may include a memory operable to store, for each image item data packet received by the first interface, the respective digital images and associated metadata for each image item in the image item data packet.

In some embodiments, at least a portion of the metadata included in the second image item conforms to a different metadata format standard for image items than the metadata format standard to which the metadata included in the first image item conforms. In some embodiments, for at least one of the image items, a portion of the metadata is identified as having been translated from its original format or value to a modified format or value using a country-specific translation, and the image item processing engine may further include a metadata validation and adjustment application operable to determine whether the translation from the original format or value to the modified format or value was performed correctly, and to correct the modified format or value responsive to a determination that the translation from the original format or value to the modified format or value was performed incorrectly.

In some embodiments, for at least one of the first image item or the second image item, the metadata further includes one or more of a first value in a first currency, a second value in a second currency into which the first value was translated, an identifier of a negotiable instrument type for the physical item, or an identifier of an originating institution for the physical item. In some embodiments, the image item processing engine may include a metadata validation and adjustment application operable to determine whether the translation from the first value in the first currency to the second value in a second currency was performed using a valid exchange rate, and to correct the second value by translating the first value using a valid exchange rate responsive to a determination that the translation from the first value in the first currency to the second value in a second currency was performed using an invalid exchange rate.

In some embodiments, the first interface may be further operable to receive, from a second image capture application, a second image item data packet including a third image item and a fourth image item. The sender of the image item identified in the metadata included in the third image item and in the fourth image item may be different than the sender of the image item identified in the metadata included in the first image item and in the second image item. The item type identification application may be further operable to apply the predetermined sorting rules to determine an item type for the third image item based on the metadata included in the third image item, apply the predetermined sorting rules to determine an item type for the fourth image item based on the metadata included in the fourth image item, and determine, based on the item type for the third image item and the item type for the fourth image item, a second recipient institution to which the second image item data packet is to be transferred for performance of the actions documented by the respective digital images included in the third image item and the fourth image item. The transfer packet constructor may be further operable to assemble a second data transfer packet including the digital image included in the third image item, the metadata associated with the third image item, the digital image included in the fourth image item, and the metadata associated with the fourth image item. The second data transfer packet may be a data transfer packet of a second transfer packet type selected based on the second recipient institution. The second interface may be further operable to provide the second data transfer packet to the transfer packet routing service for routing to the second recipient institution.

The problems associated with transferring image items of multiple types between computers are problems necessarily rooted in computer technologies. In conventional systems for exchanging digital image data, hardware and software used to capture and sort digital image data representing certain physical items is typically designed to support a single type of physical item and corresponding digital image. In addition, automatic transfer processes included in these systems are typically hard-coded to support the transfer of individual digital images or, in some cases, packets containing multiple digital images of a single type (e.g., digital images that have the same format and that are associated with metadata having the same format and content requirements). Conventional systems are typically unable to automatically handle received digital image data that includes digital images of disparate types and must instead divert the received data to an exception process that might rely on a manual sorting exercise or other intervention on the part of human operators or administrators of the system. As described in detail throughout this disclosure, by using an item type identification application and a transfer packet constructor, among other elements, to process image item data packets, a disclosed image item processing engine provides a technical solution that addresses the problems associated with the use of a conventional system for digital image data exchange, and the capability (or lack thereof) of the conventional system to automatically route image item data packets containing image items of disparate types to appropriate recipient institutions for processing.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system and methods described in the present application may allow multiple image items of different types to be transferred between computers operated by, or on behalf of, different institutions, some of which may operate in different countries, automatically and within a single data transfer packet. For example, the system may be configured to receive an image item data packet that includes multiple image items including digital images of different types and associated metadata, and to apply sorting rules to determine a type for each image item and a type for the image item data packet based on the associated metadata. At least some of the sorting rules may be dependent on a country-specific metadata format, language, or currency. Based on the results of this typing, the system may be configured to determine a class of recipient institutions that is capable of, and is authorized to, process image item data packets having the particular type (or types) of image items included in the image item data packet and to assemble a single data transfer packet, including all of the image items and associated data, that meets the formatting and content requirements of institutions of the determined class for incoming data transfer packets. The system may then initiate the routing of the data transfer packet to a recipient institution of the determined type for processing.

Figure 1:
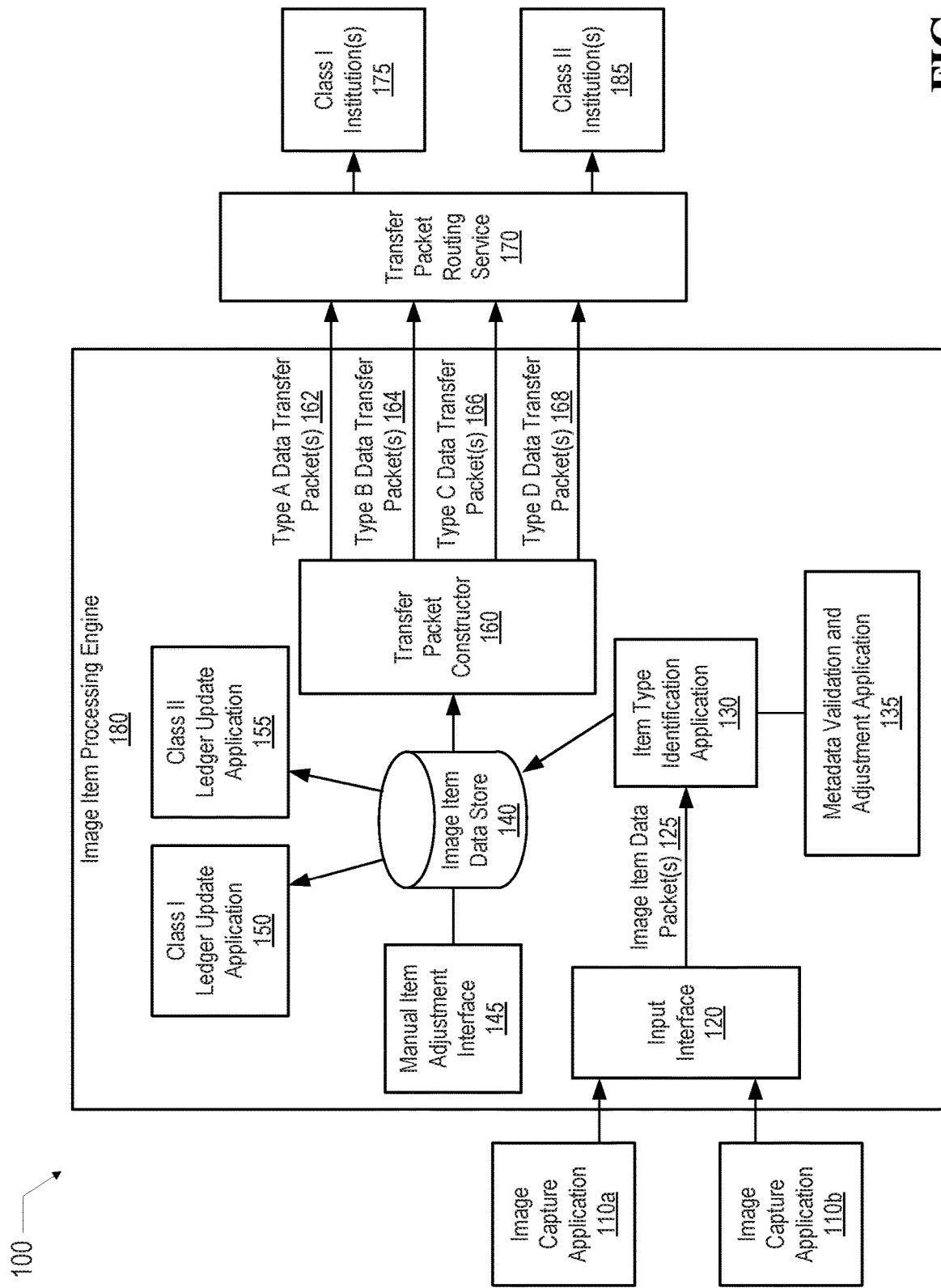
FIG. 1 is a schematic diagram of an embodiment of a system configured to transfer image items of different types between computers.

FIG. 1 is a schematic diagram of an embodiment of a system 100 configured to transfer image items of different types between computers. In the illustrated embodiment, system 100 includes multiple image capture applications 110, an image item processing engine 180, a transfer packet routing service 170, and multiple recipient institutions, shown as one or more Class I institutions 175 and one or more Class II institutions 185.

In some embodiments, each image capture application 110 may be implemented on a computing system operated by, or on behalf of, an individual or institution to capture digital images, create respective image items each containing a respective digital image and metadata associated with the digital image or the image item, and to transfer multiple image items to image item processing engine 180 within a single image item data packet through input interface 120. Image item capture applications 100 may operate on computing systems that are local or remote with respect to image item processing engine 180. For example, image capture application 110a may execute on a computing device of an individual (e.g., a mobile phone) and image capture application 110b may execute on a computer system of an institution or enterprise.

The digital images may be digital images of physical items captured by a camera or scanner or may by digital documents or files created using any of various digital image editing applications or tools. In some embodiments, image capture application 110 may be configured to scan multiple physical items (e.g., documents) to create respective digital images, to create image items each containing one of the digital images, to associate the image items with metadata (e.g., through annotation of the digital images or by tagging the digital images or image items), and to assemble the image items into a single image item data packet (e.g., a document, file, or other data packet representation) for transfer to image item processing engine 180. In one example, the metadata may take the form of an extensible markup language (XML) payload that is carried along with the digital image in an image item. Some of the metadata may be extracted from the digital images themselves, e.g., using any suitable using any suitable computer vision and/or object detection tools or technologies. Some of the metadata may be generated by the image capture application 110 to indicate characteristics of an image item (e.g., a country of origin or operation for the image item, for an originator of the image item, or for a recipient institution, an identifier of the sender of the image item, e.g., the holder of corresponding physical item, or an indication of a service level associated with the sender or originator of the image item). In some embodiments, the service level may represent, or be based on, a customer type, a type of originating institution, or a type of recipient institution associated with an image item or image item data packet. For example, some individuals or institutions may be authorized to submit or process image item data packets that include image items of multiple types and/or image items associated with different countries in a single data packet, while other individuals or institutions may not be authorized to submit and/or process image item data packets that include image items of certain combinations of types and/or image items associated with certain combinations of countries in a single data packet.

In some embodiments, the metadata may include an indication that an image item is an international item rather than a domestic item. In some embodiments, an image item for which the sender, originator, recipient institution, or image item itself is associated with a country other than the country in which (or on whose behalf) the image item processing engine 180 operates may be considered an international image item. In some embodiments, the image capture application 110 may be configured to translate a portion of the metadata extracted from the digital image of an international image item that is specific to one country to generate modified metadata that is specific to another country. In this case, the metadata contained in the image item may include both the original and modified portion of the metadata, along with an indication that the portion of the metadata has been translated. For example, some international image items (e.g., check or other negotiable instruments) may include metadata in a different format or language than domestic items or may include values that are country-specific (e.g., values represented in a currency other than a domestic currency). An image capture application 110 may be configured to translate a first value represented in the metadata for an image item in one currency to a second value in another currency and to include both the first and second values in the metadata associated with the image item. In some embodiments, identifiers of the two currencies and/or data representing the exchange rate used to perform the translation may be included in the metadata associated with the image item.

In some embodiments, the physical items captured in the respective digital images in each image item may document a respective action to be taken by an eventual recipient of the image item (e.g., a recipient institution). These may include, by example and not limitation, documents representing contract documents to be approved, legal orders to be carried out, invoices to be paid, purchase orders to initiate payments, deposit instructions, withdrawal instructions, checks, or other negotiable instruments. In some embodiments, the digital images of physical items that are considered legal documents may also be considered legal documents. In one example, an image capture application 110 may be a remote bank deposit application executing on a mobile phone or other computing device of an individual that allows the individual to scan or take a picture of a check and send the digital image to their bank to effect the deposit of funds without the need to pass the physical check document to the bank.

In some embodiments, image item processing engine 180 may be configured to receive image item data packets created and transferred to the computer on which image item processing engine 180 executes by an image capture application 110, to analyze the contents of the image item data packets to determine whether the image item data packet includes domestic items of various types, international items of various types, or a mix of domestic and international items, to select an appropriate recipient institution (or recipient institution type) to receive and process the image item data packets based on the analysis, to assemble data transfer packets in accordance with the requirements of the selected recipient institution, and to initiate the routing of the data transfer packets to the selected recipient institutions for performance of the actions documented in the image items.

In the illustrated embodiment, image item processing engine 180 includes input interface 120, item type identification application 130, metadata validation and adjustment application 135, manual item adjustment interface 145, image item data store 140, Class I ledger update application 150, Class II ledger update application 155, and transfer packet constructor 160.

In some embodiments, input interface 120 may be configured to receive image item data packets 125 (each of which may include multiple image items each documenting an action to be taken by a recipient institution, and metadata associated with the image item) from image capture applications 110, as described above.

In some embodiments, item type identification application 130 may be configured to apply predetermined sorting rules to the contents of the received image item data packets 125 to determine an image item type for each image item in the received image item data packets based on the metadata associated with the image items and/or the image item data packets. In some embodiments, item type identification application 130 may be configured to extract and analyze the metadata associated with each image item to determine whether it is an international or domestic item, to determine a country of origin or operation for the image item, for an originator of the image item, or for a recipient institution, to determine an identifier of the sender of the image item (e.g., the holder of corresponding physical item), or to determine an indication of a service level associated with the sender or originator of the image item, and to sort the received image item data packets 125 in accordance with the results of the analysis. In one example, item type identification application 130 may be configured to identify and separately process image item data packets 125 that include only domestic items, only international item, or a mix of domestic and international items.

In some embodiments, item type identification application 130 may be configured to determine whether a combination of image item types in a given image item data packet is allowable, in general or with respect to an associated service level, and to route the image item data packet to an exception handling process, if the combination cannot be processed as a single image item data packet. In some embodiments, item type identification application 130 may also be configured to determine a class of institution to which an image item data packet is to be transferred for processing based on the image item types. For example, certain classes of recipient institutions may be authorized to receive and process image item packets 125 containing image items of particular types while other classes of recipient institutions might not be authorized to receive and process image item packets containing image items of those types.

In some embodiments, metadata validation and adjustment application 135 may be configured to perform metadata validation for each image item, and to correct the metadata associated with the image item, if necessary. For example, if an image item includes metadata identified as having been generated through a country-specific translation (e.g., a format change, a language translation, or a currency translation), metadata validation and adjustment application 135 may determine whether the translation of the metadata was done correctly (e.g., that the resulting format is correct, that language translations were performed correctly, or that an exchange rate used for a currency translation was correct within a predetermined tolerance), and to correct the metadata translation, if necessary. For example, if a currency translation was performed with an invalid exchange rate, metadata validation and adjustment application 135 may correct the translation by performing the translation using a valid exchange rate. For image items containing digital images of checks or other negotiable instruments, metadata corresponding to a routing number or other visible identifier on the check or negotiable instrument may be included in the metadata received in the image item data packet and/or may be extracted from the digital images after they are received by the image item processing engine 180. The routing number on an international check or negotiable instrument may have a different format than the routing number on a domestic check or negotiable instrument, and may have been translated from one routing number format to another by the image capture application 110 from which it was received. If this translation was performed incorrectly, metadata validation and adjustment application 135 may be configured to correct the translation.

In some embodiments, a manual item adjustment interface 145 may allow a user (e.g., an administrator of the image item processing engine) to manually correct metadata associated with an image item if it was incorrectly encoded by the image capture application 110 from which it was received.

In some embodiments, image item data store 140 may be configured to store, for each image item data packet received input interface 120, the respective digital images and associated metadata for each image item in the image item data packet.

In some embodiments, data representing the actions documented by the image items with image item packets may be provided to selected one of a plurality of ledger update applications for posting. The selected ledger update application being one that is operable to receive and post data representing the actions documented by the respective digital images included in image item data packets (and corresponding data transfer packets) of a particular types of image item data packets and/or data transfer packets (e.g., image items determined to be associated with particular classes of recipient institutions). For example, based on metadata associated with image items in a first image item data packet 125, the first image item data packet may be classified as one of one or more image item data packet types to be routed to a Class I recipient institution for processing. Therefore, data representing the actions documented in those image items may be provided to Class I ledger update application 150 for posting to a ledger in which actions documented in digital images within image item data packets (or corresponding data transfer packets) of the one or more packet types that are routed to the Class I ledger for processing are recorded. In another example, based on metadata associated with image items in a second image item data packet 125, the second image item data packet may be classified as one of one or more image item data packet types to be routed to a Class II recipient institution for processing. Therefore, data representing the actions documented in those image items may be provided to Class II ledger update application 155 for posting to a ledger in which actions documented in digital images within image item data packets (or corresponding data transfer packets) of the one or more packet types that are routed to the Class II ledger for processing are recorded. In some embodiments, posting actions to be taken by recipient institutions to the ledgers may allow pending results of the actions to be visible prior to the corresponding data transfer packets being processed by the recipient institutions.

In some embodiments, transfer packet constructor 160 may be configured to assemble a data transfer packet including the image items and associated metadata of an image item data packet for the determined recipient institution class of an image item data packet, and to initiate the routing of the data transfer packet to an institution of that class by proving the data transfer packet to transfer packet routing service 170. For example, transfer packet constructor 160 may build a document, file, or other data packet representation including digital images and associated metadata obtained from image item data store 140 and may format the document, file, or other data packet representation in accordance with requirements of the recipient institutions for incoming data transfer packets. In some embodiments, the contents and/or format of the data transfer packet may be dependent on the country in which the recipient institution operates, or on whose behalf the recipient institution operates. Therefore, depending on the countries associated with the image items in the image item data packet, transfer packet constructor 160 may select different metadata from image item data store 140 for inclusion in the data transfer packet and/or may arrange the selected metadata differently for routing to recipient institutions operating in, or on behalf of, different countries.

In some embodiments data transfer packets may be routed to particular recipient institutions based on a service level associate with the corresponding image item data packet and/or the countries associated with the corresponding image item data packet. In the illustrated example, type A data transfer packets 162 may include only domestic items to be routed to a domestic recipient institution, type B data transfer packets 164 may include only international items to be routed to a single international recipient institution, type C data transfer packets 166 may include only international items to be routed to a single domestic recipient institution, and type D data transfer packets 168 may include a mix of domestic and international items to be routed to a single domestic recipient institution. In this example, type A data transfer packets 162 may be routed to a Class II recipient institution 185, while type B data transfer packets 164, type C data transfer packets 166, and type D data transfer packets 168 may be routed to a Class I recipient institution 175. Other types of data transfer packets may be defined and constructed for routing to authorized recipient institutions, in other embodiments. In some embodiments, particular types of data transfer packets may be flagged for exception processing, e.g., if there are no authorized recipient institutions to which the packet can be automatically routed for processing or if the data transfer packets include a combination of image items, metadata, or other characteristic for which at least some manual processing is required.

In some embodiments, transfer packet routing service 170 may, on behalf of image item processing engine 180, route data transfer packets to respective recipient institutions of the class determined to be authorized to process the data transfer packets. The recipient institutions may be authorized to perform, or to facilitate performance of, certain types of actions documented in the image items contained in the data transfer packets it receives on behalf of particular individual originators or originator institutions (e.g., individual originators or originators institutions having particular service level credentials). In some embodiments, a given recipient instruction may be a member of more than one institution class.

FIG. 1 illustrates an example embodiment of a system configured for transferring multiple image items of different types between computers in a single data packet. In other embodiments, a system configured for transferring multiple image items of different types between computers in a single data packet may include more, fewer, or different elements than those illustrated in FIG. 1. In addition, functionality described as being implemented by a specific element in system 100 may be implemented by one or more other elements in other embodiments, or the collective functionality of system 100 may be distributed between elements differently than as illustrated in FIG. 1.

Figure 2:
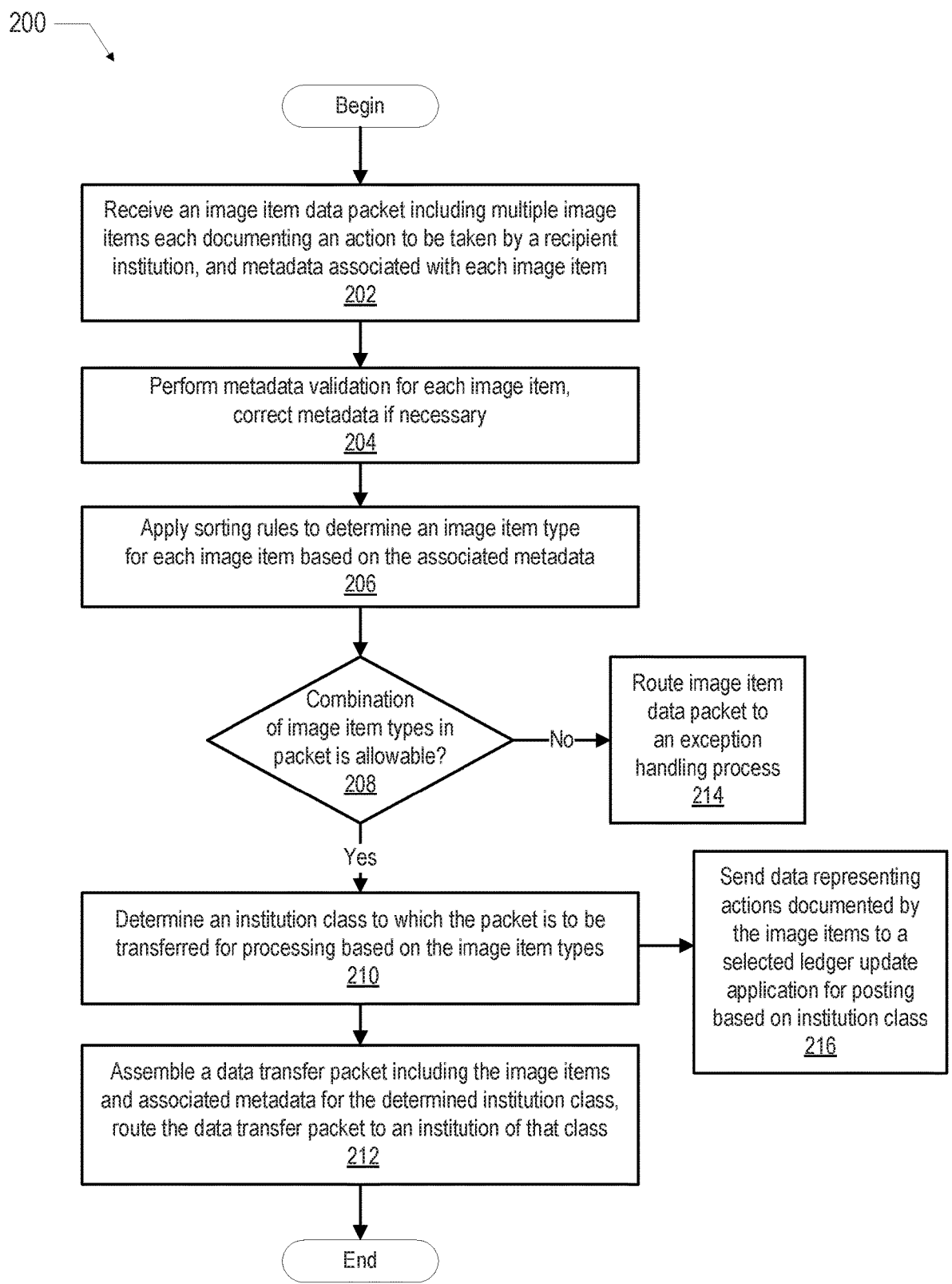
FIG. 2 is a flowchart of an embodiment of a method for transferring image items of different types between computers.

FIG. 2 is a flowchart of an embodiment of a method 200 for transferring image items of different types between computers. In particular embodiments, some or all of the operations of method 200 may be performed by an image item processing engine, such as image item processing engine 180 illustrated in FIG. 1.

Method 200 begins and, at 202, includes receiving an image item data packet including multiple image items each documenting an action to be taken by a recipient institution, and metadata associated with each image item. For example, each image item may include a digital image of a physical item documenting an action to be taken by an eventual recipient of the image item. The metadata may include data indicating a country of origin or operation for the image item, for an originator of the image item, or for a recipient institution, an identifier of the sender of the image item (e.g., the holder of corresponding physical item), or an indication of a service level associated with the sender or originator of the image item. A portion of the metadata may be identified as having been translated from its original format or value to a modified format or value using a country-specific translation.

At 204, the method may include performing metadata validation for each image item, and correcting at least some of the metadata, if necessary. For example, the method may include correcting a country-specific format translation or correcting a language translation or a currency translation, as described above in reference to metadata validation and adjustment application 135.

At 206, the method may include applying sorting rules to determine an image item type for each image item based on the associated metadata, as described above in reference to item type identification application 130.

If, at 208, it is determined, based on the sorting rules, that the combination of image item types included in the image item data packet is allowable, method 200 may proceed to 210. Otherwise, method 200 may proceed to 214. At 214, the method may include routing the image item data packet to an exception handling process.

Figure 3:
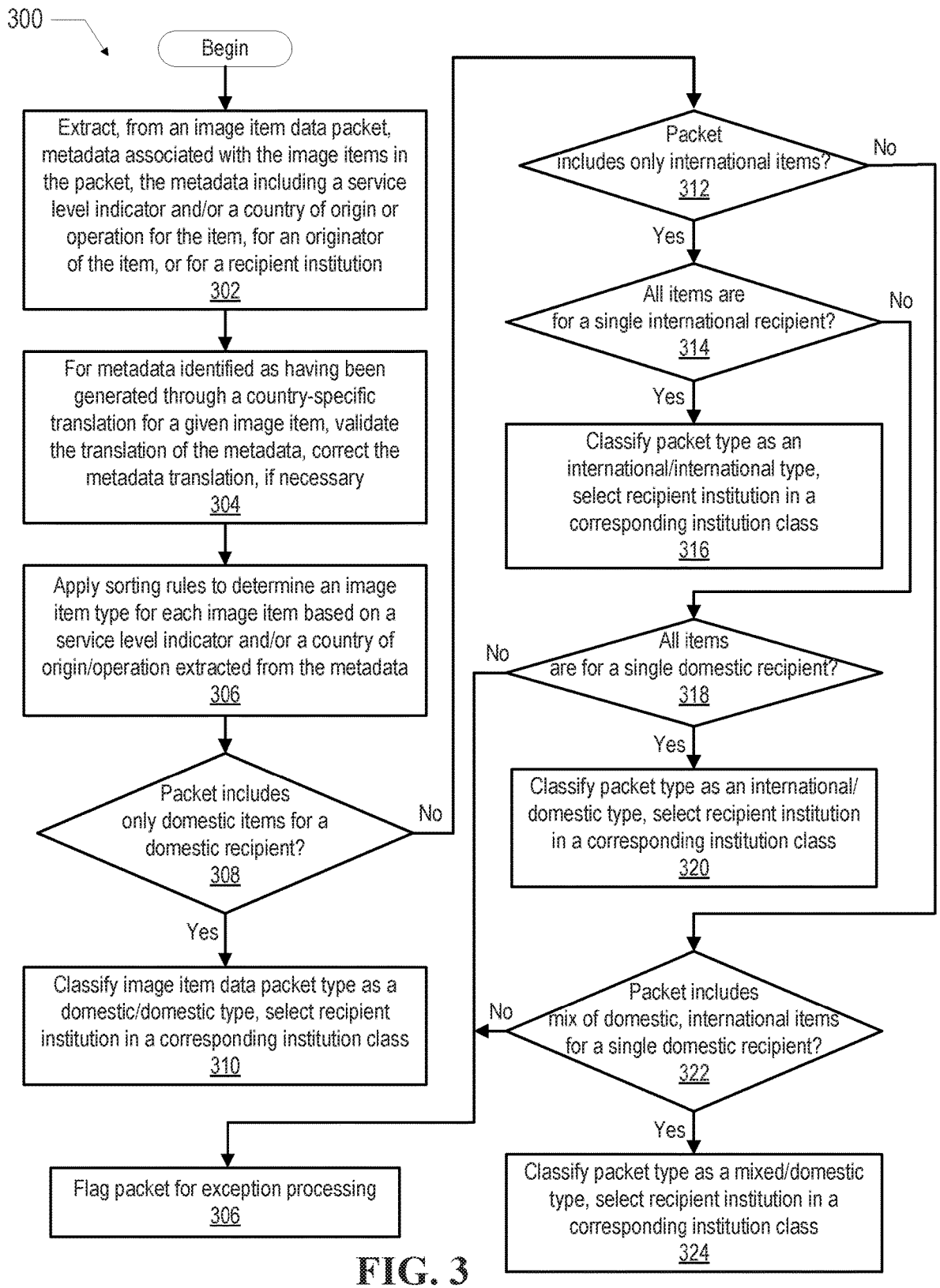
FIG. 3 is a flowchart of an embodiment of a method for determining recipients of a data transfer packet containing multiple image items.

At 210, method 200 may include determining a class of institution to which the packet is to be transferred for processing based on the image item types, after which the operations shown as 212 and 216 may be performed in any order or substantially in parallel. One embodiment of a method for determining recipients of a data transfer packet is illustrated in FIG. 3 and described in detail below.

At 212, method 200 may include assembling a data transfer packet, including the image items and associated metadata, for the determined institution class, and routing the data transfer packet to an institution of that class, as described above in reference to transfer packet constructor 160. In some embodiments, assembling the data transfer packet may be dependent on a country-specific format, language, currency, or other characteristic due to varying government regulations, industry standards, or local practices in particular countries or other jurisdictions.

At 216, the method may include sending data representing actions documented by the image items to a selected ledger update application for posting, as described above in reference to Class I ledger update application 150 and Class II ledger update application 155. The ledger update application may be selected based on the determined institution class.

Particular embodiments may repeat one or more steps of method 200, where appropriate. For example, some or all of the operations illustrated in FIG. 2 may be repeated for each image item data packet that is received by the image item processing engine from an image capture application to analyze and transfer the image items in the packet to a recipient institution for processing. Although this disclosure describes and illustrates particular steps of method 200 as occurring in a particular order, this disclosure contemplates any suitable steps of method 200 occurring in any suitable order. Moreover, although this disclosure describes and illustrates an example method for transferring image items of different types between computers including the particular steps of method 200, this disclosure contemplates any suitable method for transferring image items of different types between computers including any suitable steps, which may include all, some, or none of the steps of method 200, where appropriate. Furthermore, although this disclosure describes and illustrates particular components, devices, or systems carrying out particular steps of method 200, this disclosure contemplates any suitable combination of any suitable components, devices, or systems carrying out any suitable steps of method 200.

FIG. 3 is a flowchart of an embodiment of a method for determining recipients of a data transfer packet containing multiple image items. In particular embodiments, some or all of the operations of method 300 may be performed by image item processing engine 180.

Method 300 begins and, at 302, includes extracting, from an image item data packet, metadata associated with the image items in the image item data packet. Among other things, the metadata may include, for each image item, a service level indicator and/or a country of origin or operation for the item, for an originator of the item, or for a recipient institution. In particular embodiments, the service level indicator may include an identifier of the sender of the image item data packet and/or the image items included in the packet, such as a customer who has submitted the image item data packet for routing, by the image item processing engine, to an appropriate recipient institution for performing actions documented in the image items. For example, different customers or clients of image item processing engine 180 may be associated with different service levels. For example, an individual or a business customer may have credentials associated with a standard service level (allowing them to access image item exchange service for certain types of image item data packets, but not others) or with a premium service level (which may allow them to access more or different types of image item exchange services than are available to users with standard service level credentials). In another example, domestic customers may have credentials associated with a first service level (allowing them to access one set of image item exchange services) and international customers may have credentials associated with second service level (allowing them to access a second set of image item exchange services, some or all of which may be different than the services accessible to domestic customers).

At 304, the method may include, for metadata identified as having been generated through a country-specific translation for a given image item, validating the translation of the metadata, and correcting the metadata translation, if necessary, as described above in reference to metadata validation and adjustment application 135.

At 306, method 300 may include applying predetermined sorting rules to determine an image item type for each image item in the packet based on a service level indicator and/or a country of origin/operation extracted from the metadata associated with the image item, as described above in reference to item type identification application 135.

If, at 308, it is determined that the image item data packet includes only domestic items for a domestic recipient institution, method 300 may proceed to 310. Otherwise, method 300 may proceed to 312. If, at 312, it is determined that the packet includes only international items, method 300 may proceed to 314. Otherwise, method 300 may proceed to 322.

If, at 314, it is determined that all image items in the image item data packet are for a single international recipient, method 300 may proceed to 316. Otherwise, method 300 may proceed to 318. At 316, method 300 may include classifying the image item data packet type as an international/international type, and selecting a recipient institution in a corresponding institution class.

If, at 318, it is determined that all image items in the image item data packet are for a single domestic recipient, method 300 may proceed to 320. Otherwise, method 300 may proceed to 306. At 320, method 300 may include classifying the image item data packet type as an international/domestic type, and selecting a recipient institution in a corresponding institution class.

If, at 322, it is determined that the image item data packet includes a mix of domestic and international items for a single domestic recipient, method 300 may proceed to 324. Otherwise, method 300 may proceed to 306. At 306, the method may include flagging the image item data packet for exception processing. At 324, method 300 may include classifying the image item data packet type as a mixed/domestic type, and selecting a recipient institution in a corresponding institution class.

Particular embodiments may repeat one or more steps of method 300, where appropriate. For example, some or all of the operations illustrated in FIG. 3 may be repeated for each image item data packet that is received by the image item processing engine to determine authorized recipient institutions for processing the image item data packet. Although this disclosure describes and illustrates particular steps of method 300 as occurring in a particular order, this disclosure contemplates any suitable steps of method 300 occurring in any suitable order. Moreover, although this disclosure describes and illustrates an example method for determining recipients of a data transfer packet containing multiple image items, including the particular steps of method 300, this disclosure contemplates any suitable method for determining recipients of a data transfer packet containing multiple image items including any suitable steps, which may include all, some, or none of the steps of method 300, where appropriate. For example, different types of sorting rules may be applied to image item data packets to determine the recipients of various data transfer packet containing multiple image items than those described in reference to FIG. 3. Furthermore, although this disclosure describes and illustrates particular components, devices, or systems carrying out particular steps of method 300, this disclosure contemplates any suitable combination of any suitable components, devices, or systems carrying out any suitable steps of method 300.

Figure 4:
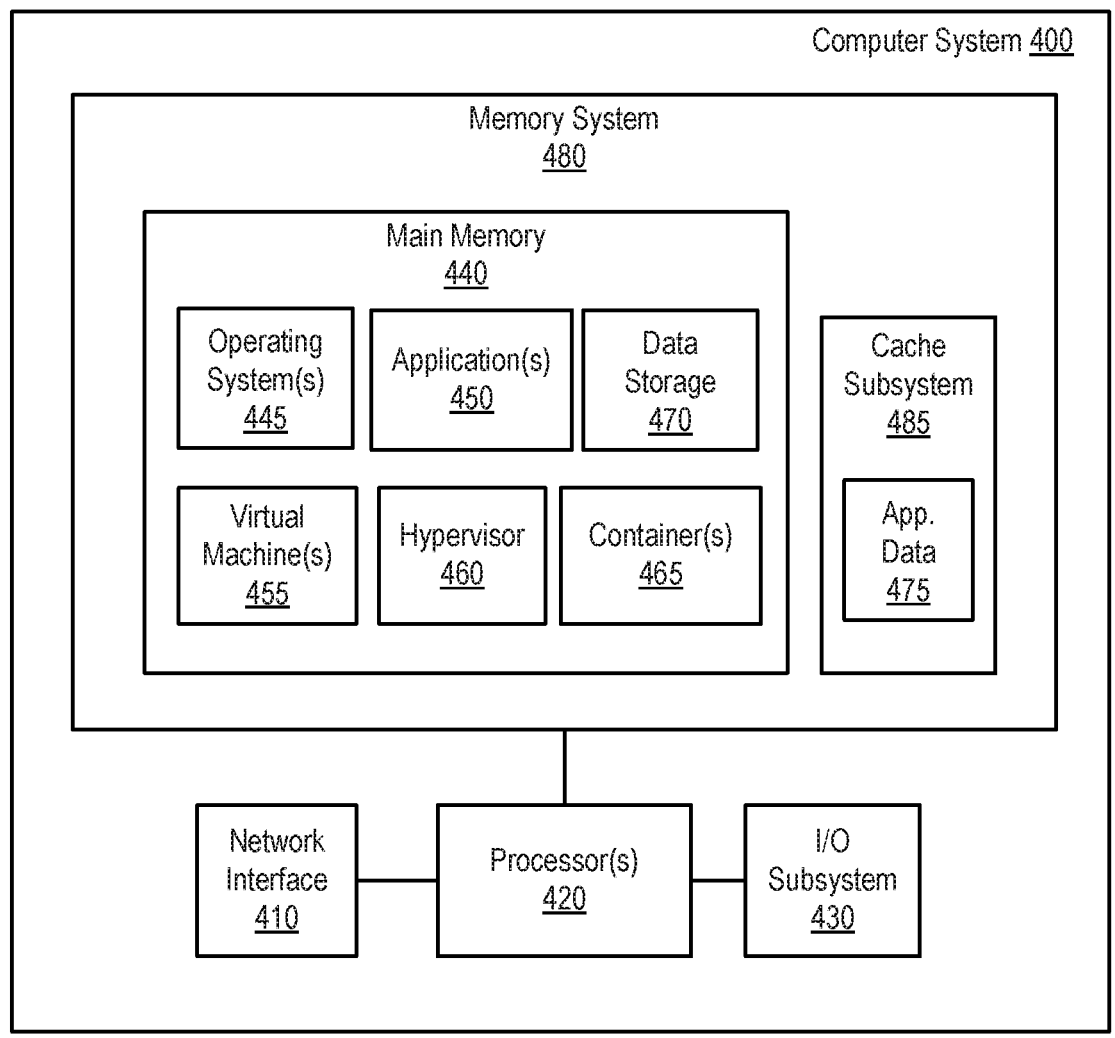
FIG. 4 illustrates an example of a computer system, according to one or more embodiments.

Turning now to FIG. 4, an example of a computer system 400 is illustrated, according to one or more embodiments. As shown, a computer system 400 may include one or more processors 420, a memory system 480, a network interface 410, and an input/output (I/O) subsystem 430. As illustrated, memory system 480, network interface 410, and I/O subsystem 430 may be communicatively coupled to processor 420. Memory system 480 may include a main memory 440 and a cache subsystem 485. In various embodiments, cache subsystem 485 may, depending on the architecture of the computer system on which cache subsystem 485 resides, include a single cache that is internal to a processor 420 or multiple levels of internal cache, some of which are accessible by multiple processors 420. In another embodiment, cache subsystem 485 may reside external to processors 420 or may include a combination of both internal and external caches depending on the particular implementation and needs. In some embodiments, cache subsystem 485 may be configured to store, at least temporarily, application data 475. For example, cache subsystem 485 may implement a local application cache for storing some or all of the contents of various image item data packets that has been or will be analyzed by image item processing engine 180, digital images or metadata extracted from image item data packets, sorting rules, data representing actions to be taken by recipient institutions that have been or will be posted by ledger update applications, intermediate results of any of the operations described herein, and any configurable parameters of image item processing engine 180 implemented on one or more computer systems 400 are, at least temporarily, stored. Main memory 440 and cache subsystem 485 may be implemented using any suitable type of memory medium, in various embodiments.

In one or more embodiments, the term "memory medium" may mean a "memory device", a "memory", a "storage device", a "tangible computer readable storage medium", and/or a "computer-readable medium". In one example, main memory 440 and/or cache subsystem 485 may be or include a volatile memory medium. For instance, the volatile memory medium may lose stored data when the volatile memory medium no longer receives power. In a second example, main memory 440 and/or cache subsystem 485 may be or include a non-volatile memory medium. For instance, the non-volatile memory medium may not lose stored data when the volatile memory medium no longer receives power or when power is not applied. In another example, main memory 440 and/or cache subsystem 485 may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

As shown, main memory 440 may include one or more operating systems 445, one or more applications 450, one or more virtual machines 455, a hypervisor 460, and one or more containers 465. In other embodiments, main memory 440 may include more, fewer, or different elements than those illustrated in FIG. 4. In some embodiments, one or more of operating systems 445, applications 450, virtual machines 455, hypervisor 460, and/or containers 465 may include instructions executable by processors 420. For example, in various embodiments, applications 450 may include instructions executable by one or more of processors 420 to perform any or all of the operations of method 200 illustrated in FIG. 2 or method 300 illustrated in FIG. 3, or to implement the functionality of any element of image item processing engine 180 or system 100 illustrated in FIG. 1.

As discussed above, in various embodiments, main memory 440 may include any combination of non-volatile and/or volatile memory elements (not shown in FIG. 4.) In one example, processor 420 may execute instructions of one or more of applications 450, virtual machines 455, hypervisor 460, and/or containers 465 via a non-volatile memory medium. In another example, one or more portions of the instructions of operating systems 445, applications 450, virtual machines 455, hypervisor 460, and/or containers 465 may be transferred to a volatile memory medium, and processor 420 may execute the one or more portions of the instructions of via the volatile memory medium.

In one or more embodiments, hypervisor 460 may include one or more of software, firmware, and hardware that creates and executes one or more virtual machines (e.g., one or more of virtual machines 455). For example, computer system 400 may be considered host machine when hypervisor 460 executes and one or more of virtual machines 455 are executed via hypervisor 460. For instance, a virtual machine (virtual machine) (e.g., a virtual machine of virtual machines 455) may be considered a guest machine.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS may behave and/or may appear like multiple different, individual computer systems. In various embodiments, one or more of containers 465 may be or include software in a file system that includes one or more of instructions executable by a processor (e.g., a program, software, an application, server software, a service, etc.), one or more runtime libraries, one or more system tools, and one or more system libraries, among others. In various embodiments, one or more of containers 465 may provide and/or may implement operating system-level virtualization via a virtual environment that includes a separate process space and/or a separate network space, rather than creating and/or implementing a virtual machine.

In one or more embodiments, I/O subsystem 430 may include or represent a variety of communication interfaces, graphics interfaces, video interfaces, user input interfaces, and/or peripheral interfaces, among others. For example, I/O subsystem 430 may include one or more of a touch screen, a display, a display adapter, and a universal serial bus (USB) interface, among others. For instance, a touch screen may include circuitry that enables touch functionality in conjunction with a display that is driven by a display adapter.

In one or more embodiments, network interface 410 may be configured to be coupled to a network. For example, network interface 410 may permit computer system 400 to be communicatively coupled to a network. In one instance, network interface 410 may be configured to be coupled to a wired network. In a second instance, network interface 410 may be configured to be coupled to a wireless network. In a third instance, network interface 410 may be configured to be coupled to an optical network. In some embodiments, network interface 410 may be configured to be coupled to a secure network over which image items within image item data packets and/or data transfer packets are exchanged with originating individuals/institutions and recipient institutions, respectively. In some embodiments, image item processing engine 180 may be communicatively coupled to one or more image capture applications executing on remote computer systems through network interface 410. In some embodiments, image item processing engine 180 may be communicatively coupled to one or more recipient institutions through network interface 410.

In one or more embodiments, one or more of main memory 440, network interface 410, and I/O subsystem 430 may be communicatively coupled to processor 420 via one or more buses. For example, a bus may include one or more of a peripheral component interconnect (PCI) bus, a serial peripheral interface (SPI) bus, an inter-integrated circuit ($I^2C$) bus, an enhanced serial peripheral interface (eSPI) bus, a system management bus (SMBus), a universal serial bus, and a low pin count (LPC) bus, among others. In one or more embodiments, one or more of main memory 440, network interface 410, and I/O subsystem 430 may be communicatively coupled to processor 420 via one or more of a PCI-Express (PCIe) root complex and one or more PCIe switches, among others.

In one or more embodiments, processor 420 may execute instructions in implementing one or more systems, flowcharts, methods, and/or processes described herein. In one example, processor 420 may execute processor instructions from main memory 440 in implementing one or more systems, flowcharts, methods, and/or processes described herein. These may include, by example and not limitation, method item type identification application 130, metadata validation and adjustment application 135, manual adjustment interface 145, transfer packet constructor 160, image item data store 140, Class I ledger update application 150, Class II ledger update application 155, or any other functionality of any element of image item processing engine 180 or system 100 illustrated in FIG. 1. In another example, processor 420 may execute instructions received via network interface 410 in implementing one or more systems, flowcharts, methods, and/or processes described herein.

In one or more embodiments, processor 420 may include circuitry that may interpret and/or execute program instructions and/or process data, among others. For example, processor 420 may include one or more of a system, a device, and an apparatus that may interpret and/or execute program instructions and/or process data, among others. For instance, processor 420 may include one or more of a central processing unit (CPU), a microprocessor, a graphics processing unit (GPU), an application processor, a digital signal processor (DSP), and an application specific integrated circuit (ASIC), among others.

In some embodiments, the functionality of various elements of system 100 illustrated in FIG. 1 may be implemented, collectively, by multiple computer systems, each of which may or may not be similar to computer system 400 illustrated in FIG. 4. Some of these computer systems may implement the functionality of an image item processing engine 180 that processes image item data packets to facilitate the transfer of image items including image items of different types (e.g., image items for which the image items, the image item originators and/or the recipient institutions may be associated with different countries) between originators and/or senders of the image item data packets and recipient institutions that perform actions documented in the image items.

Figure 5:
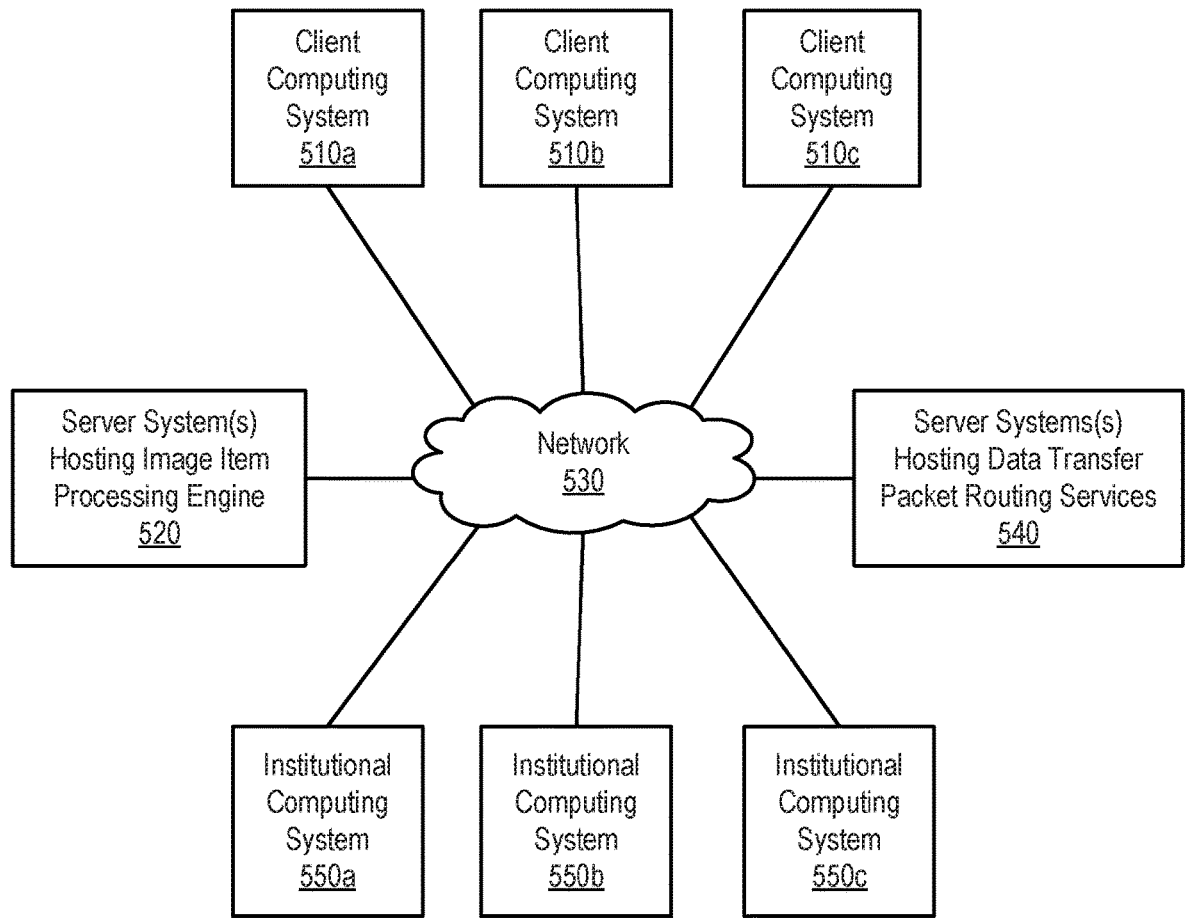
FIG. 5 illustrates an example of multiple computer systems coupled to a network, according to one or more embodiments.

For example, FIG. 5 illustrates multiple computer systems coupled to a network, according to one or more embodiments. These computer systems include three client computing systems 510 (which may implement respective image capture applications 110 on behalf of individuals or institutions), one or more server systems 520 that, collectively or individually, are configured to implement an image item processing engine (such as image item processing engine 180 illustrated in FIG. 1), one or more server systems 540 configured to host data transfer packet routing services (e.g., secure data packet transfer services through which image items within data transfer packets are transferred from an image item processing engine 180 executing on a server 520 to recipient institutions executing on a server 540, or image items within image item data packets are transferred from a client computing system 510 to an image item processing engine 180 executing on a server 520), and three institutional computing systems 550 (e.g., computing system of recipient institutions) each of which may be authorized and configured to receive image items within data transfer packets and to perform the actions documented by the digital images in the image items. In various embodiments, any or all of computer systems 510, 520, 540, and 550 may include elements similar to those of computer system 400 illustrated in FIG. 4. As shown, computer systems 510, 520, 540, and 550 may be communicatively coupled to a network 530. In one or more embodiments, network 530 may include one or more of a wired network, an optical network, and a wireless network. For example, network 530 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 530 may be coupled to one or more other networks. For example, network 530 may be coupled to one or more of a LAN, a WAN, a WLAN, a MAN, a PSTN, a public WAN, a private WAN, a cellular telephone network, a satellite telephone network, and a VPN, among others.

Several example systems for transferring multiple image items of different types between computers in a single data packet described in the present disclosure involve the exchange of image items representing foreign and/or domestic checks or other negotiable instruments that are transferred to recipient institutions to perform actions related to those instruments (e.g., making corresponding deposits or withdrawals). In other embodiments, the image item processing engines described in the present disclosure may be used to automatically transfer other types of image items having different origins or other characteristics to suitable recipient institutions for processing within a single data transfer packet on behalf of individuals, institutions, or enterprises. By incorporating the system and methods of the image item processing engine described herein, including the use of an item type identification application and a transfer packet constructor, individuals, institutions or enterprises that exchange image items with the recipient institutions that perform actions documented in those image items may benefit from the ability to automatically route image items of different types between computing systems in a single data transfer packet.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for image item exchange, comprising a memory and a hardware processor configured to implement:
an image item processing engine, comprising:
a first interface operable to:
communicatively couple the image item processing engine to one or more image capture applications from which image item data packets are received, each image item data packet including a plurality of image items, each image item including a respective digital image of a physical item documenting an action to be taken by a respective recipient institution and metadata associated with the respective digital image, the metadata including an identifier of the sender of the image item, and at least one of an identifier of a country associated with the physical item, an identifier of a country associated with the packet originator, or an identifier of a country associated with the respective recipient institution; and
receive, from a first image capture application, a first image item data packet including a first image item and a second image item, at least one country identified in the metadata included in the second image item being different than a country identified in the metadata included in the first image item, the first image item and the second image item having different data types, at least a portion of the metadata included in the second image item conforms to a different metadata format standard for image items than the metadata format standard to which the metadata included in the first image item conforms;
an item type identification application operable to:
apply predetermined sorting rules to determine an item type for the first image item based on the metadata included in the first image item;
apply the predetermined sorting rules to determine an item type for the second image item based on the metadata included in the second image item; and
determine, based on the item type for the first image item and the item type for the second image item, a selected one of a plurality of recipient institutions to which the first image item data packet is to be transferred for performance of the actions documented by the respective digital images included in the first image item and the second image item; and
a transfer packet constructor operable to:
assemble a first data transfer packet comprising the respective digital image included in the first image item, the metadata associated with the first image item, the respective digital image included in the second image item, and the metadata associated with the second image item, the first data transfer packet being a data transfer packet of a first one of a plurality of data transfer packet types selected based on the selected recipient institution, the metadata associated with the first image item being arranged differently in the first data transfer packet than the metadata associated with the second image item in response to the at least one country identified in the metadata included in the second image item being different than the country identified in the metadata included in the first image item; and a second interface operable to:
communicatively couple the image item processing engine to a transfer packet routing service operable to route data transfer packets to respective recipient institutions; and
provide the first data transfer packet to the transfer packet routing service, wherein the transfer packet routing service routes the first data transfer packet to the selected recipient institution, the selected recipient institution performs an action documented by the first image item and an action documented by the second image item.

2. The system of claim 1, wherein:
each of the plurality of recipient institutions is a member of a respective class of recipient institutions authorized to receive data transfer packets of one or more specific data transfer packet types; and
the selected recipient institution is a member of a first class of recipient institutions authorized to receive data transfer packets of the first data transfer packet type.

3. The system of claim 2, wherein:
the system further comprises a plurality of ledger update applications, each operable to receive and post data representing the actions documented by the respective digital images included in data transfer packets of one or more specific data transfer packet types; and
a first one of the plurality of ledger update applications is operable to receive and post data representing the actions documented by the respective digital images included in the first data transfer packet.

4. The system of claim 1, further comprising:
a memory operable to store, for each image item data packet received by the first interface, the respective digital images and associated metadata for each image item in the image item data packet.

5. The system of claim 1, wherein:
for at least one of the first image item or the second image item, a portion of the metadata is identified as having been translated from its original format or value to a modified format or value using a country-specific translation; and
the system further comprises a metadata validation and adjustment application operable to:
determine whether the translation from the original format or value to the modified format or value was performed correctly; and
correct the modified format or value responsive to a determination that the translation from the original format or value to the modified format or value was performed incorrectly.

6. The system of claim 1, wherein, for at least one of the first image item or the second image item, the metadata further includes one or more of a first value in a first currency, a second value in a second currency into which the first value was translated, an identifier of a negotiable instrument type for the physical item, or an identifier of an originating institution for the physical item.

7. The system of claim 6, further comprising:
a metadata validation and adjustment application operable to:
determine whether the translation from the first value in the first currency to the second value in a second currency was performed using a valid exchange rate; and
correct the second value by translating the first value using a valid exchange rate responsive to a determination that the translation from the first value in the first currency to the second value in a second currency was performed using an invalid exchange rate.

8. The system of claim 1, wherein:
the first interface is further operable to:
receive, from a second image capture application, a second image item data packet including a third image item and a fourth image item, the sender of the image item identified in the metadata included in the third image item and in the fourth image item being different than the sender of the image item identified in the metadata included in the first image item and in the second image item;
the item type identification application is further operable to:
apply the predetermined sorting rules to determine an item type for the third image item based on the metadata included in the third image item;
apply the predetermined sorting rules to determine an item type for the fourth image item based on the metadata included in the fourth image item; and
determine, based on the item type for the third image item and the item type for the fourth image item, a second recipient institution to which the second image item data packet is to be transferred for performance of the actions documented by the respective digital images included in the third image item and the fourth image item;
the transfer packet constructor is further operable to:
assemble a second data transfer packet comprising the respective digital image included in the third image item, the metadata associated with the third image item, the respective digital image included in the fourth image item, and the metadata associated with the fourth image item, the second data transfer packet being a data transfer packet of a second transfer packet type selected based on the second recipient institution; and
the second interface is further operable to:
provide the second data transfer packet to the transfer packet routing service for routing to the second recipient institution.

9. A method for image item exchange comprising:
receiving, from an image capture application, a first image item data packet including a first image item and a second image item, each image item including a respective digital image of a physical item documenting an action to be taken by a respective recipient institution and metadata associated with the respective digital image, the metadata including an identifier of the sender of the image item, and at least one of an identifier of a country associated with the physical item, an identifier of a country associated with the packet originator, or an identifier of a country associated with the respective recipient institution, at least one country identified in the metadata included in the second image item being different than a country identified in the metadata included in the first image item, the first image item and the second image item having different data types at least a portion of the metadata included in the second image item conforms to a different metadata format standard for image items than the metadata format standard to which the metadata included in the first image item conforms;

applying predetermined sorting rules to determine an item type for the first image item based on the metadata included in the first image item;

applying the predetermined sorting rules to determine an item type for the second image item based on the metadata included in the second image item;

determining, based on the item type for the first image item and the item type for the second image item, a selected one of a plurality of recipient institutions to which the first image item data packet is to be transferred for performance of the actions documented by the respective digital images included in the first image item and the second image item;

assembling a first data transfer packet comprising the respective digital image included in the first image item, the metadata associated with the first image item, the respective digital image included in the second image item, and the metadata associated with the second image item, the first data transfer packet being a data transfer packet of a first one of a plurality of data transfer packet types selected based on the selected recipient institution, the metadata associated with the first image item being arranged differently in the first data transfer packet than the metadata associated with the second image item in response to the at least one country identified in the metadata included in the second image item being different than the country identified in the metadata included in the first image item; and providing the first data transfer packet to a transfer packet routing service, wherein the transfer packet routing service routes the first data transfer packet to the selected recipient institution, the selected recipient institution performs an action documented by the first image item and an action documented by the second image item.

10. The method of claim 9, wherein:
each of the plurality of recipient institutions is a member of a respective class of recipient institutions authorized to receive data transfer packets of one or more specific data transfer packet types; and
the selected recipient institution is a member of a first class of recipient institutions authorized to receive data transfer packets of the first data transfer packet type.

11. The method of claim 9, further comprising:
storing, in a memory, the respective digital images and associated metadata included in the first image item and the second image item; and
providing data representing the actions documented by the respective digital images included in the first image item and the second image item to a selected one of a plurality of ledger update applications for posting, the selected ledger update application being operable to receive and post data representing the actions documented by the respective digital images included in data transfer packets of the first data transfer packet type.

12. The method of claim 9, wherein:
for at least one of the first image item or the second image item, a portion of the metadata is identified as having been translated from its original format or value to a modified format or value using a country-specific translation; and
the method further comprises:
determining that the translation from the original format or value to the modified format or value was performed incorrectly; and
correcting the modified format or value.

13. The method of claim 9, wherein:
for at least one of the first image item or the second image item, the metadata further includes one or more of a first value in a first currency, a second value in a second currency into which the first value was translated, an identifier of a negotiable instrument type for the physical item, or an identifier of an originating institution for the physical item; and
the method further comprises:
determining that the translation from the first value in the first currency to the second value in a second currency was performed using an invalid exchange rate; and
correcting the second value by translating the first value using a valid exchange rate.

14. The method of claim 9, further comprising:
receiving a second image item data packet including a third image item and a fourth image item, the sender of the image item identified in the metadata included in the third image item and in the fourth image item being different than the sender of the image item identified in the metadata included in the first image item and in the second image item;
applying the predetermined sorting rules to determine an item type for the third image item based on the metadata included in the third image item;
applying the predetermined sorting rules to determine an item type for the fourth image item based on the metadata included in the fourth image item; and
determining, based on the item type for the third image item and the item type for the fourth image item, a second recipient institution to which the second image item data packet is to be transferred for performance of the actions documented by the respective digital images included in the third image item and the fourth image item;
assembling a second data transfer packet comprising the respective digital image included in the third image item, the metadata associated with the third image item, the respective digital image included in the fourth image item, and the metadata associated with the fourth image item, the second data transfer packet being a data transfer packet of a second transfer packet type selected based on the second recipient institution; and
providing the second data transfer packet to a transfer packet routing service for routing to the second recipient institution.

15. An image item processing engine for image item exchange, the image item processing engine comprising a memory and a hardware processor configured to implement:
a first interface operable to:
communicatively couple the image item processing engine to one or more image capture applications from which image item data packets are received, each image item data packet including a plurality of image items, each image item including a respective digital image of a physical item documenting an action to be taken by a respective recipient institution and metadata associated with the respective digital image, the metadata including an identifier of the sender of the image item, and at least one of an identifier of a country associated with the physical item, an identifier of a country associated with the packet originator, or an identifier of a country associated with the respective recipient institution; and receive, from a first image capture application, a first image item data packet including a first image item and a second image item, at least one country identified in the metadata included in the second image item being different than a country identified in the metadata included in the first image item, the first image item and the second image item having different data types, at least a portion of the metadata included in the second image item conforms to a different metadata format standard for image items than the metadata format standard to which the metadata included in the first image item conforms;

an item type identification application operable to:
apply predetermined sorting rules to determine an item type for the first image item based on the metadata included in the first image item;
apply the predetermined sorting rules to determine an item type for the second image item based on the metadata included in the second image item; and
determine, based on the item type for the first image item and the item type for the second image item, a selected one of a plurality of recipient institutions to which the first image item data packet is to be transferred for performance of the actions documented by the respective digital images included in the first image item and the second image item; and a transfer packet constructor operable to:
assemble a first data transfer packet comprising the respective digital image included in the first image item, the metadata associated with the first image item, the respective digital image included in the second image item, and the metadata associated with the second image item, the first data transfer packet being a data transfer packet of a first one of a plurality of data transfer packet types selected based on the selected recipient institution, the metadata associated with the first image item being arranged differently in the first data transfer packet than the metadata associated with the second image item in response to the at least one country identified in the metadata included in the second image item being different than the country identified in the metadata included in the first image item; and a second interface operable to:
communicatively couple the image item processing engine to a transfer packet routing service operable to route data transfer packets to respective recipient institutions; and
provide the first data transfer packet to the transfer packet routing service, wherein the transfer packet routing service routes the first data transfer packet to the selected recipient institution, the selected recipient institution performs an action documented by the first image item and an action documented by the second image item.

16. The image item processing engine of claim 15 wherein:
each of the plurality of recipient institutions is a member of a respective class of recipient institutions authorized to receive data transfer packets of one or more specific data transfer packet types; and
the selected recipient institution is a member of a first class of recipient institutions authorized to receive data transfer packets of the first data transfer packet type.

17. The image item processing engine of claim 16, wherein:
the image item processing engine further comprises a plurality of ledger update applications, each operable to receive and post data representing the actions documented by the respective digital images included in data transfer packets of one or more specific data transfer packet types; and
a first one of the plurality of ledger update applications is operable to receive and post data representing the actions documented by the respective digital images included in the first data transfer packet.

18. The image item processing engine of claim 15, wherein:
for at least one of the first image item or the second image item, a portion of the metadata is identified as having been translated from its original format or value to a modified format or value using a country-specific translation; and
the image item processing engine further comprises a metadata validation and adjustment application operable to:
determine whether the translation from the original format or value to the modified format or value was performed correctly; and
correct the modified format or value responsive to a determination that the translation from the original format or value to the modified format or value was performed incorrectly.

19. The image item processing engine of claim 15, wherein:
for at least one of the first image item or the second image item, the metadata further includes one or more of a first value in a first currency, a second value in a second currency into which the first value was translated, an identifier of a negotiable instrument type for the physical item, or an identifier of an originating institution for the physical item; and
the image item processing engine further comprises a metadata validation and adjustment application operable to:
determine whether the translation from the first value in the first currency to the second value in a second currency was performed using a valid exchange rate; and
correct the second value by translating the first value using a valid exchange rate responsive to a determination that the translation from the first value in the first currency to the second value in a second currency was performed using an invalid exchange rate.

* * * * *

UNITED STATES PATENT AND TRADEMARK OFFICE
CERTIFICATE OF CORRECTION

PATENT NO. : 10,652,370 B2
APPLICATION NO. : 15/835138
DATED : May 12, 2020
INVENTOR(S) : Timmy Leo Gauvin et al.

It is certified that error appears in the above-identified patent and that said Letters Patent is hereby corrected as shown below:

On the Title Page

Item (54), and In the Specification, Column 1, Lines 1-4, delete "System and Method for Transferring Image Systems of Different Types Between Computers in a Single Data Packet" and insert -- System and Method for Transferring Image Items of Different Types Between Computers in a Single Data Packet --, therefor.

In the Claims

In Claim 9, Column 21, Line 6, delete "...having different data types at least a portion of the..." and insert -- ...having different data types, at least a portion of the... --, therefor.

Signed and Sealed this
First Day of March, 2022

Drew Hirshfeld
*Performing the Functions and Duties of the
Under Secretary of Commerce for Intellectual Property and
Director of the United States Patent and Trademark Office*